(12) United States Patent
Unno

(10) Patent No.: US 8,910,004 B2
(45) Date of Patent: Dec. 9, 2014

(54) INFORMATION PROCESSING APPARATUS, AND METHOD OF CONTROLLING INFORMATION PROCESSING APPARATUS

(75) Inventor: Hideyuki Unno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/612,098

(22) Filed: Sep. 12, 2012

(65) Prior Publication Data

US 2013/0262947 A1  Oct. 3, 2013

(30) Foreign Application Priority Data

Mar. 30, 2012 (JP) ................................. 2012-083177

(51) Int. Cl.
*H03M 13/00* (2006.01)
*G06F 11/00* (2006.01)
*G06F 11/10* (2006.01)

(52) U.S. Cl.
CPC .......... *G06F 11/1016* (2013.01); *G06F 11/004* (2013.01)
USPC .......................................... 714/746; 714/758

(58) Field of Classification Search
CPC ..... G06F 11/1016; G06F 11/004; G06F 3/06; G06F 3/062
USPC .................. 714/746, 758, 764, 766
See application file for complete search history.

(56) References Cited

U.S. PATENT DOCUMENTS

| | | | |
|---|---|---|---|
| 2004/0128464 A1* | 7/2004 | Lee et al. ...................... | 711/171 |
| 2007/0168762 A1 | 7/2007 | Bartley et al. | |
| 2008/0172584 A1* | 7/2008 | Meller et al. .................. | 714/702 |
| 2009/0271763 A1* | 10/2009 | Varma et al. .................. | 717/114 |
| 2012/0030543 A1* | 2/2012 | Ge et al. ........................ | 714/766 |
| 2012/0079342 A1* | 3/2012 | Lu et al. ........................ | 714/755 |
| 2012/0311380 A1* | 12/2012 | Moyer .......................... | 714/6.13 |

FOREIGN PATENT DOCUMENTS

| | | |
|---|---|---|
| EP | 2187527 A2 | 5/2010 |
| EP | 2187527 A3 | 10/2012 |
| JP | 55-25812 | 2/1980 |
| JP | 61-26152 | 2/1986 |

(Continued)

OTHER PUBLICATIONS

Doe Hyun Yoon and Mattan Erez. 2009. Flexible cache error protection using an ECC FIFO. In Proceedings of the Conference on High Performance Computing Networking, Storage and Analysis (SC '09). ACM, New York, NY, USA, Article 49, 12 pages.*

(Continued)

*Primary Examiner* — Cynthia Britt
(74) *Attorney, Agent, or Firm* — Staas & Halsey LLP

(57) ABSTRACT

A mark adding unit adds first information that is erroneously generated error detecting data of first data stored in a first storage area of a memory to the first data and adds second information that is erroneously generated error detecting information of second data stored in a second storage area to the second data. A mark removing unit removes the second information in the second data by rewriting the second information with the error detecting information of the second data without rewriting the first information in the first data when the second storage area out of the first storage area and the second storage area is configured to be usable. An error detecting unit performs an error detecting process of read-out data using information that is added to the read-out data in a case where the data stored in the memory is read out.

7 Claims, 9 Drawing Sheets

(56) References Cited

FOREIGN PATENT DOCUMENTS

| JP | 02-181845 | 7/1990 |
| JP | 09-305418 | 11/1997 |
| JP | 2002-149495 | 5/2002 |

OTHER PUBLICATIONS

Jingfei Kong; Huiyang Zhou; , "Improving privacy and lifetime of PCM-based main memory," Dependable Systems and Networks (DSN), 2010 IEEE/IFIP International Conference on, vol., No., pp. 333-342, Jun. 28, 2010-Jul. 1, 2010.*

European Search Repor mailed Aug. 20, 2013 in corresponding European Patent Application No. 12185406.1-1960 (13 pages).

European Search Report mailed Jul. 20, 2013 in corresponding European Patent Application No. 12185406.1-1960 (13 pages).

Japanese Office Action mailed Oct. 1, 2013 in corresponding Japanese Patent Application No. 2012-083177 (2 pages) (4 pages English Translation).

* cited by examiner

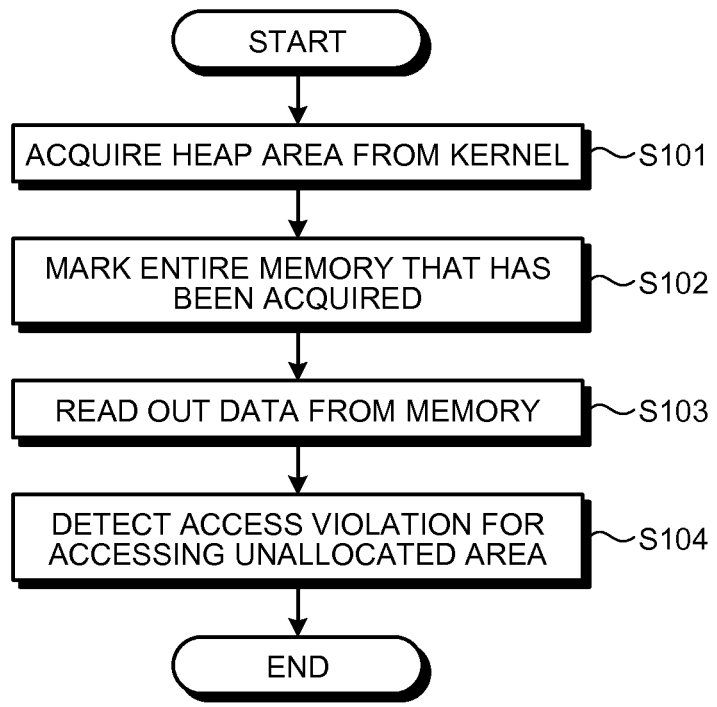

INFORMATION PROCESSING APPARATUS, AND METHOD OF CONTROLLING INFORMATION PROCESSING APPARATUS

CROSS-REFERENCE TO RELATED APPLICATION

This application is based upon and claims the benefit of priority of the prior Japanese Patent Application No. 2012-083177, filed on Mar. 30, 2012, the entire contents of which are incorporated herein by reference.

FIELD

The embodiments discussed herein are related to an information processing apparatus, a method of controlling the information processing apparatus, and a program for controlling the information processing apparatus.

BACKGROUND

Recently, multiprocessor systems each performing multiple processes that operate a plurality of processes in a parallel manner are provided. In a multiprocessor system that performs multiple processes, there are cases where a shared memory system is used in which each process uses a memory in the same range.

In such a multiprocessor system using a shared memory, there is concern that the content of the memory may be destroyed due to unauthorized use of the memory that is made by each process. Thus, several methods for preventing the destruction of a memory due to unauthorized use of the memory are proposed. Conventional methods of preventing unauthorized use of a memory are largely divided into a protection method using software and a protection method using hardware.

The protection using software prevents unauthorized use of a memory by using not only a pointer but also a key as a set in a case where the memory is referred to. For example, when a memory is to be secured like in the case of malloc, an integer value that becomes a key together with a pointer of a memory area is generated, and the memory is prevented from being accessed without using the pointer together with a correct key as a set. In addition, the protection method using hardware is realized by adding a memory protection function to a memory management unit (MMU) of the hardware.

In addition, as a method of controlling the access to a memory, there is a conventional technique in which an accessible area of the memory is restricted using a base register and an upper-limit register for each virtual counting machine. In addition, in recent years, in order to respond to an error in a memory, error check and correct (ECC) memories are provided to which an ECC function for detecting and correcting errors is added. As a conventional technique for such an ECC memory, there is a technique for freely writing an ECC code into the ECC memory.

Patent Literature 1: Japanese Laid-open Patent Publication No. 61-26152

Patent Literature 2: Japanese Examined Patent Application Publication No. 62-22199

However, according to a conventional protection method using software, a process of collating a key is performed by software for each memory access, and accordingly, the overhead due to the process increases, whereby the processing speed of the information processing apparatus decreases.

In addition, the process of the MMU is performed in units of pages each having a large size, for example, several kilobytes to several megabytes. Thus, according to a conventional protection method using hardware, the protection of a memory is performed also in units of pages, and accordingly the granularity is much rougher than the unit of memories that are managed by software, whereby it is difficult to perform memory protection that is appropriate to software.

SUMMARY

According to an aspect of an embodiment, an information processing apparatus includes: an information adding unit that adds first information that is generated by causing an error to be occurred in error detecting information of first data stored in a first storage area of a memory to the first data and adds second information that is generated by causing an error to be occurred in error detecting information of second data stored in a second storage area to the second data; a removing unit that removes the second information added to the second data by rewriting the second information with the error detecting information of the second data without rewriting the first information added to the first data when the second storage area out of the first storage area and the second storage area is configured to be usable; and an error detecting unit that performs an error detecting process of read-out data using information that is added to the read-out data in a case where the first data or the second data stored in the memory is read out.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a flowchart of a process that is performed when a heap area is acquired in the information processing apparatus according to the first embodiment;

DESCRIPTION OF EMBODIMENTS

Preferred embodiments of the present invention will be explained with reference to accompanying drawings.

However, an information processing apparatus, a method of controlling the information processing apparatus, and a program for controlling the information processing apparatus disclosed in the present application are not limited to the following embodiments.

[a] First Embodiment

Figure 1:
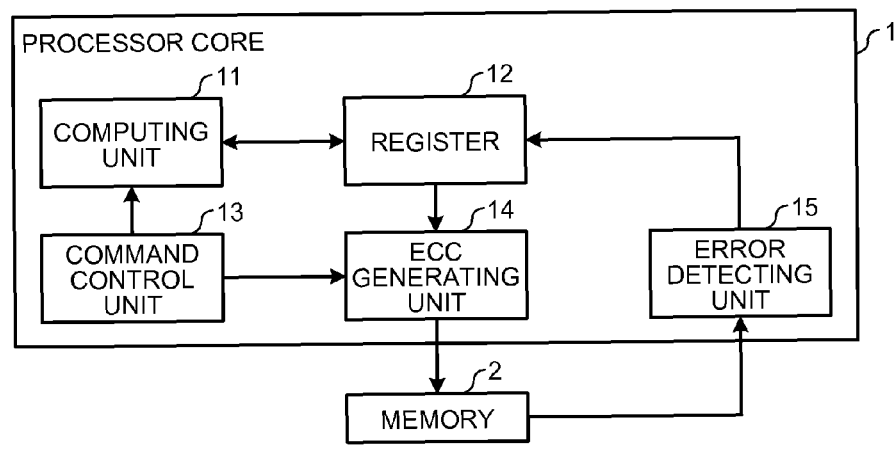
FIG. 1 is a block diagram of an information processing apparatus according to a first embodiment.

FIG. 1 is a block diagram of an information processing apparatus according to a first embodiment. As illustrated in FIG. 1, the information processing apparatus according to this embodiment includes a processor core 1 and a memory 2. In this embodiment, a case will be described in which data is stored in the memory 2 in units of eight bytes. In addition, a case will be described in this embodiment in which the error correction code of an error check and correct (ECC) is one byte.

The processor core 1 includes a computing unit 11, a register 12, a command control unit 13, an ECC generating unit 14, and an error detecting unit 15.

The computing unit 11 receives an arithmetic instruction from the command control unit 13 and performs an arithmetic operation. The computing unit 11 stores a result of the arithmetic operation in the register 12.

Figure 2:
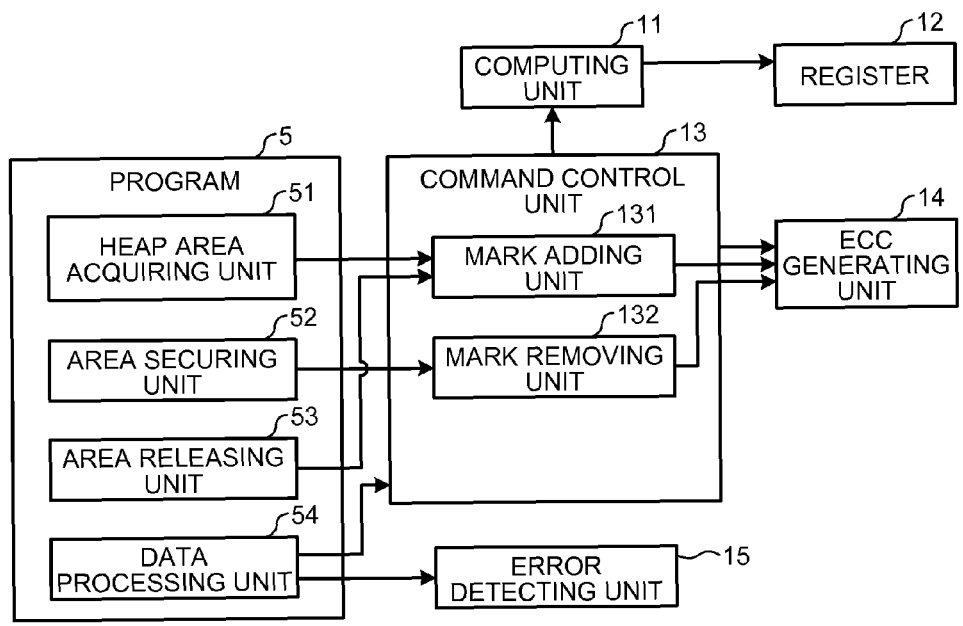
FIG. 2 is a block diagram that illustrates a computing unit and a command control unit in detail.

FIG. 2 is a block diagram that illustrates the command control unit in detail. In FIG. 2, a program 5, for example, is a program that executes a plurality of processes, and each process uses a shared memory. The program 5 includes a heap area acquiring unit 51, an area securing unit 52, an area releasing unit 53, and a data processing unit 54. In addition, the command control unit 13 includes a mark adding unit 131 and a mark removing unit 132.

The heap area acquiring unit 51 acquires a heap area from a kernel that manages memory resources of the memory 2. The heap area is an area that is allocated as a memory area that can be secured in the memory 2. The heap area acquiring unit 51 registers information of the memory area that is allocated to the heap area in a management table.

In addition, the heap area acquiring unit 51 notifies the mark adding unit 131 of the command control unit 13 of an instruction for adding a mark to the heap area. The heap area acquiring unit 51 repeatedly notifies the mark adding unit 131 of the instruction for adding a mark until the heap area is filled with data to which a mark is added. Here, the mark, for example, is identification information that represents the non-usability of a memory or a state of a memory that is protected from unauthorized use. The addition of a mark to the data will be described later in detail. This mark corresponds to an example of "information that is erroneously generated error detection information".

The area securing unit 52 receives a request for securing a memory area that is used by a process in the heap area together with the size to be secured from the process. The securing of the memory area that is used by the process in the heap area, for example, corresponds to "malloc" in the C language. Then, the area securing unit 52 determines a memory area allocated to the process that has requested for securing a memory area out of an unallocated area in the heap area by referring to the management table. Then, the area securing unit 52 registers the information of the secured memory area within the heap area in the management table. A memory area that is secured by the area securing unit 52 as a memory area that is used by the process within the heap area corresponds to an example of a "second storage area". In addition, an area other than the area secured by the area securing unit 52 within the heap area corresponds to an example of a "first storage area".

In addition, the area securing unit 52 notifies the mark removing unit 132 of the command control unit 13 of a mark removal instruction for the memory area determined to be secured. The area securing unit 52 repeatedly notifies the mark removing unit 132 of the mark removal instruction until all the marks added to the data in the secured memory area are removed. The removal of marks in the data will be described later in detail.

Furthermore, the area securing unit 52 notifies the process that has requested for securing a memory area of a beginning address of the secured memory area.

The area releasing unit 53 receives a request for releasing the used memory area from a process. The request for releasing the used memory area, for example, corresponds to "free" in the C language. The area releasing unit 53 specifies the memory area that is secured for the process that has requested for releasing the memory area. Then, the area releasing unit 53 removes the information of securing of the specified memory area within the heap area from the management table.

In addition, the area releasing unit 53 notifies the mark adding unit 131 of a mark re-addition instruction for the released memory area. The area releasing unit 53 repeatedly notifies the mark adding unit 131 of the mark re-addition instruction until the released memory area is filled with the data to which marks are re-added. The re-addition of the mark to the data will be described later in detail.

The data processing unit 54 stores or reads out data in or from the memory 2 in accordance with each process. The storing of data, for example, corresponds to the execution of a store command in the C language. In addition, the reading out of data, for example, corresponds to the execution of a load command in the C language. Then, the data processing unit 54 performs a data process such as storing data or reading-out data in or from the memory area allocated to each process for the memory area that is allocated to each process. More specifically, the data processing unit 54 determines an address at which designated data is written in an area in which the memory area secured for the process for storing data is vacant. Then, the data processing unit 54 notifies the command control unit 13 of a data writing instruction. In addition, the data processing unit 54 notifies the error detecting unit 15 of a data read-out instruction.

The mark adding unit 131 receives an instruction for adding marks to the heap area from the heap area acquiring unit 51. Then, the mark adding unit 131 notifies a bit inverting unit 141 of the ECC generating unit 14 of an instruction for inverting specific three bits of provisional data, which is stored in the heap area, to be described later. Here, in this embodiment, although the mark adding unit 131 inverts specific three bits of normal data as addition of a mark, any other information may be used as long as it is information from which a specific error is detected, and, for example, three or more bits may be inverted.

In addition, the mark adding unit 131 receives the mark re-addition instruction from the area releasing unit 53. Then, the mark adding unit 131 notifies the bit inverting unit 141 of the ECC generating unit 14 of an instruction for inverting specific three bits of the provisional data stored in the released memory area. The mark adding unit 131 is an example of an "information adding unit" and an "information re-adding unit".

The mark removing unit 132 receives the mark removal instruction from the area securing unit 52. Then, the mark removing unit 132 notifies the bit inverting unit 141 of an instruction for generating a normal error correcting code as the generation of an error correcting code corresponding to data stored in the secured memory area. The mark removing unit 132 corresponds to an example of a "removing unit".

Figure 3:
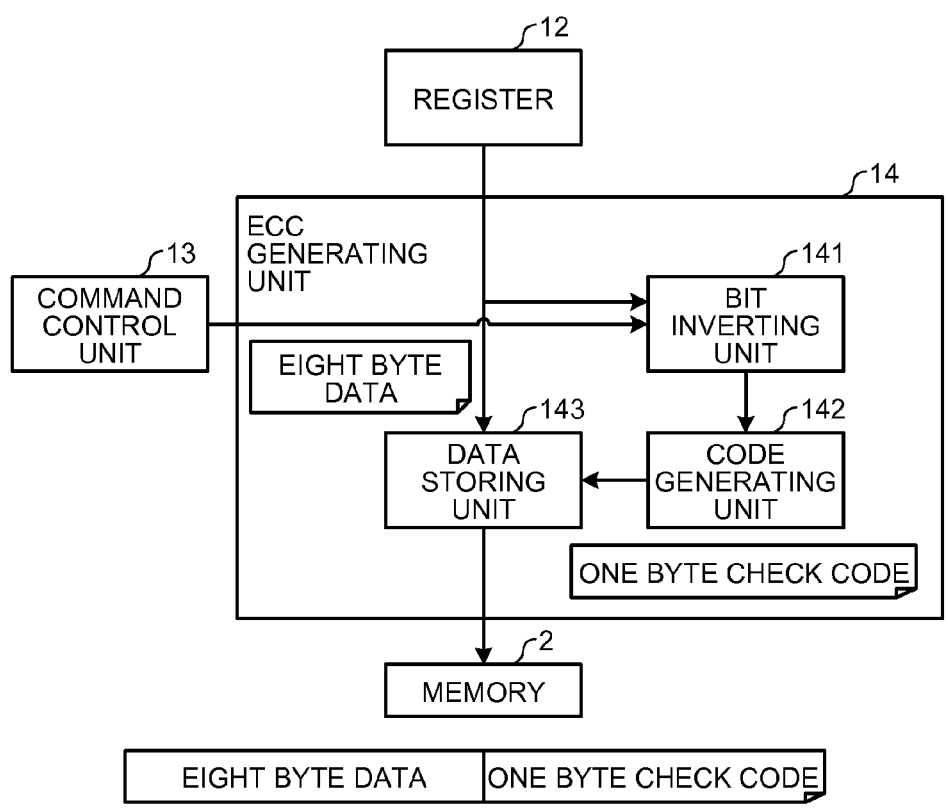
FIG. 3 is a block diagram that illustrates an ECC generating unit 14 in detail.

FIG. 3 is a block diagram that illustrates the ECC generating unit 14 in detail. As illustrated in FIG. 3, the ECC generating unit 14 includes a bit inverting unit 141, a code generating unit 142, and a data storing unit 143.

The ECC generating unit 14 acquires provisional data in a case where a heap area is secured. Here, the provisional data, for example, may be mark auxiliary information or the like that is used for representing the content of an added mark or vacant data. The provisional data may be generated by the ECC generating unit 14 or may be read out from the register 12.

The bit inverting unit 141 receives the instruction for inverting specific three bits of the provisional data from the mark adding unit 131 of the command control unit 13 in the case of securing a heap area. In addition, the bit inverting unit 141 acquires the provisional data from the register 12. Then, the bit inverting unit 141 inverts the specific three bits, which are determined in advance, of the acquired provisional data. Thereafter, the bit inverting unit 141 outputs the provisional data acquired by inverting the specific three bits to the code generating unit 142.

In addition, the bit inverting unit 141 receives an instruction for generating a normal error correcting code in accordance with the data stored in the secured memory area from the mark removing unit 132 in the case of securing a memory area. Then, the bit inverting unit 141 outputs the data acquired from the register 12 without changing the data to the code generating unit 142. In other words, in the case of securing a memory area, the bit inverting unit 141 performs an operation that is similar to the case of a normal data storing command (for example, a "store command" in the C language).

Furthermore, in the case of data writing (for example, in the case of a "store command" in the C language), the bit inverting unit 141 outputs data stored at the designated address to the code generating unit 142.

In addition, in the case of releasing a memory area, the bit inverting unit 141 receives an instruction for inverting the specific three bits of the provisional data from the mark adding unit 131 of the command control unit 13. Then, the bit inverting unit 141 inverts the specific three bits, which are determined in advance, of the provisional data stored in the released memory area. Thereafter, the bit inverting unit 141 outputs the provisional data acquired by inverting the specific three bits to the code generating unit 142.

In the case of securing a heap area, the code generating unit 142 receives an input of the provisional data acquired by inverting the specific three bits from the bit inverting unit 141. Then, the code generating unit 142 generates a check code of one byte that is an error correcting code added to the provisional data that is to be stored in the entire heap area based on the received provisional data acquired by inverting the specific three bits. Then, the code generating unit 142 outputs the generated check code of one byte to the data storing unit 143.

In addition, in the case of securing a memory area, the code generating unit 142 receives the input of the data, to which a change has not been applied, acquired from the register 12 from the bit inverting unit 141. Then, the code generating unit 142 generates a check code of one byte that is an error correcting code added to the data stored in the secured memory area based on the received data. Then, the code generating unit 142 outputs the generated check code of one byte to the data storing unit 143.

In addition, in the case of data writing (for example, in the case of a "store command" in the C language), the code generating unit 142 receives the data, which has been acquired from the register 12, from the bit inverting unit 141. Then, the code generating unit 142 generates a check code of one byte based on the received data. Then, the code generating unit 142 outputs the generated check code of one byte to the data storing unit 143.

In the case of releasing a memory area, the code generating unit 142 receives the input of the provisional data of which the specific three bits are inverted from the bit inverting unit 141. Then, the code generating unit 142 generates a check code of one byte that is an error correcting code added to the provisional data stored in the released memory area based on the received provisional data of which the specific three bits are inverted. Then, the code generating unit 142 outputs the generated check code of one byte to the data storing unit 143.

In the case of securing a heap area, the data storing unit 143 receives provisional data of eight bytes from the register 12. In addition, the data storing unit 143 acquires the check code of one byte, which is an error correcting code added to the provisional data, to be stored in the entire heap area from the code generating unit 142. Then, the data storing unit 143 adds the check code of one byte that is generated by inverting the specific three bits of the provisional data, which has been acquired from the code generating unit 142, to the acquired provisional data. As above, for example, adding the check code generated by inverting the specific three bits of the provisional data to the data is called "addition of a mark". Thereafter, the data storing unit 143 sequentially stores the provisional data to which the mark has been added so as to cover the entire heap area of the memory 2. In other words, the data storing unit 143 fills the entire heap area with the provisional data to which the mark has been added. Here, in the addition of a mark, since the check code generated by inverting the specific three bits of normal data is added to the data, an ECC error occurs in a case where the data to which the mark has been added is checked. The storing of the data of a predetermined size to which the mark has been added in the heap area corresponds to an example of "adding a mark that causes an error for each predetermined area in a first area of the memory".

Figure 4A:
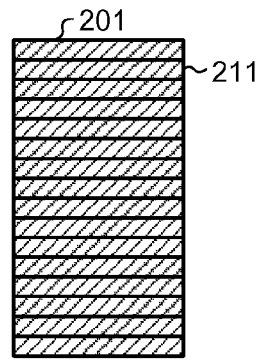
FIG. 4A is a diagram that illustrates the state of data that is stored in a heap area at a time point at which the heap area is secured.

FIG. 4A is a diagram that illustrates the state of data that is stored in the heap area at a time point at which the heap area is secured. A memory 201 illustrated in FIG. 4A represents the state of the heap area within the memory 2 at a time point at which the heap area is secured. Each box within the memory 201 represents an area in which data of eight bytes+a check code of one byte are stored. Like a box 211, a box that is shaded by slanting lines represents data to which a check code generated by inverting the specific three bits of the provisional data is added as the check code of one byte. In other words, a box that is shaded by slanting lines like the box 211 represents that data to which a mark is added is stored. Like the memory 201, the entire heap area is filled with data to which the mark is added at a time point when the heap area is secured. In such a state, data to which a mark is added is referred to at any address within the heap area.

In the case of securing a memory area, the data storing unit 143 receives data of eight bytes that is stored in the secured memory area from the register 12. In addition, the data storing unit 143 acquires a check code of one byte that is an error correcting code added to each received data from the code generating unit 142. Then, the data storing unit 143 adds the check code of one byte that is generated by using the provisional data acquired from the code generating unit 142 without any change to the acquired data. By adding the check code, the check code generated by inverting the specific three bits of data is excluded from data to be stored in the secured memory area. As above, excluding the check code that is generated by inverting the specific three bits of data from the data is called "removal of a mark". Then, the data storing unit 143 stores data of which the mark is removed in the secured memory area. Accordingly, the data storing unit 143 fills the secured memory area with the data from which the mark has been removed. The filling of the secured memory area with the data from which the mark has been removed corresponds to an example of "removing a mark added to each predetermined area in the second area".

Figure 4B:
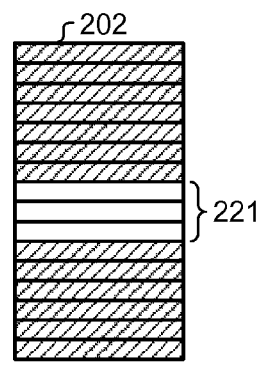
FIG. 4B is a diagram that illustrates the state of data that is stored in the heap area in a case where a memory area is secured for one process.

FIG. 4B is a diagram that illustrates the state of data that is stored in the heap area in a case where a memory area is secured for one process. A memory 202 illustrated in FIG. 4B illustrates the state of a heap area inside the memory 2 in a case where a memory area is secured for one process. An area 221 is the memory area that is secured for one process. A box that is not shaded, which is illustrated in the area 221, represents that data from which a mark has been removed is stored. In other words, like the memory 202, in a case where a memory area is secured for a process, the secured memory area is filled with data from which the mark has been removed. Then, an area of the memory 202 other than the area 221 is filled with data to which a mark is added. In this state, for example, in processing the process to which the area 221 is allocated, in a case where an area other than the area 221 is referred to by the process, the process refers to data to which a mark has been added.

Figure 4C:
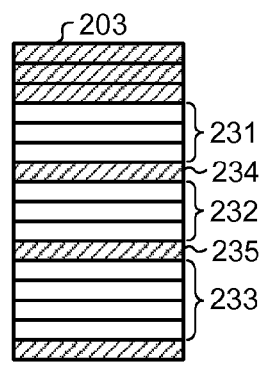
FIG. 4C is a diagram that illustrates the state of data that is stored in a heap area in a case where memory areas are secured for a plurality of processes.

FIG. 4C is a diagram that illustrates the state of data that is stored in a heap area in a case where memory areas are secured for a plurality of processes. A memory 203 illustrated in FIG. 4C illustrates the state of a heap area inside the memory 2 in a case where a memory area is secured for a plurality of processes. An area 231 is a memory area that is secured for a process. In addition, an area 232 is a memory area that is secured for another process. In addition, an area 233 is a memory area that is secured for a further another process. As illustrated in FIG. 4C, in a case where memory areas are allocated to a plurality of processes, the memory areas are allocated such that secured memory areas are not continuous to each other. More specifically, an area 234 to which a mark is added is interposed between the area 231 and the area 232. In addition, an area 235 to which a mark is added is interposed between the area 232 and the area 233. By allocating as such, for example, in a case where the area 232 is referred to, in a case where the pointer of a reference destination goes beyond the area 232, the process that refers to an area refers to an area 234 or 235 to which a mark is added, and accordingly, the process does not incorrectly refer to an area for any other process, to which a mark has not been added. Accordingly, destruction due to overrun or the like can be prevented.

In the case of writing data into a memory area, when a mark is not added to data stored at a referring address, the data storing unit 143 reads out data stored in the register 12 from the register 12. In addition, the data storing unit 143 acquires a check code that corresponds to the read-out data from the code generating unit 142. Then, the data storing unit 143 adds the acquired check code to the read-out data and stores resultant data at a designated address within the memory 2.

In the case of releasing a memory area, the data storing unit 143 receives provisional data of eight bytes from the register 12. In addition, the data storing unit 143 acquires a check code of one byte that is an error correcting code added to the provisional data to be stored in the released memory area from the code generating unit 142. Then, the data storing unit 143 adds the check code of one byte that is generated by inverting the specific three bits of the provisional data acquired from the code generating unit 142 to the acquired provisional data. In this way, adding the check code generated by inverting the specific three bits of the provisional data again to the data in a memory area from which the marks have been removed is called "re-addition of marks". When a mark is added to the data stored in the released memory area, the data storing unit 143 sequentially stores the provisional data to which marks have been re-added in the released memory area of the memory 2. Accordingly, the data storing unit 143 fills the released memory area with data to which marks have been re-added. Filling the released memory area with data to which marks have been re-added corresponds to an example of "re-adding marks for each predetermined area in a released second area".

In a case where the program 5 stores data, before storing the data, the error detecting unit 15 reads out data from an address inside the memory 2 which is designated as a storage destination of the data by the data processing unit 54. Then, the error detecting unit 15 determines whether or not a mark has been added to the read-out data. In a case where a mark has been added to the data stored at the referring address, the error detecting unit 15 detects an error. For example, in a case where the program 5 accesses a memory area that has not been secured or the like, the error detecting unit 15 detects an access violation of the program 5 for accessing an unallocated area. In addition, in a case where a process refers to a memory area that is secured for another process or the like, the error detecting unit 15 detects a memory usage violation. Furthermore, in a case where the program 5 accesses a memory area that has been already released, the error detecting unit 15 detects an access violation for accessing an area that has already been released. Then, the error detecting unit 15 registers individual error reports in the register 12. Here, in this embodiment, although the error detecting unit 15 reads out data from an address designated as a storage destination and determines whether or not there is a mark even in the case of storing data, any other method may be used. For example, when data is stored in the data storing unit 143 of the ECC generating unit 14, it may be determined whether or not a mark has been added to data that is stored at the address of the storage destination.

In a case where the program 5 reads out data, the error detecting unit 15 determines whether or not there is an error in the data read out from the memory area located at a designated address. More specifically, in a case where a mark has been added to the data read out from the memory area, the error detecting unit 15 detects an error and registers a report of the error in the register 12. For example, in a case where the program 5 refers to a memory area that has not been secured or the like, the error detecting unit 15 detects a mark included in the data read out from the memory 2, thereby detecting an access violation. In addition, in a case where the program 5 refers to a memory area that is secured for a process other than the process that has designated the address or the like, the error detecting unit 15 detects a memory usage violation. Furthermore, in a case where the program 5 accesses a memory area that has already been released, the error detecting unit 15 detects an access violation for accessing an area that has already been released by detecting a mark included in the data read out from the memory 2. Then, the error detecting unit 15 registers reports of individual errors in the register 12.

In contrast to this, in a case where data from which a mark has been removed is stored in the memory area referred to by the program 5, the error detecting unit 15 reads out designated data from the memory 2. Then, the error detecting unit 15 stores the read-out data in the register 12.

In addition, in a case where the program 5 releases a memory area, the error detecting unit 15 reads out data from the released memory area and determines whether or not a mark has been added to the read-out data. Then, in a case where a mark has not been added to the data stored in the memory area to be released, the error detecting unit 15 detects an error of a double release violation. This error detecting unit 15 corresponds to an example of an "error detecting unit".

Next, the flow of a process performed when a heap area is acquired in an information processing apparatus according to this embodiment will be described with reference to FIG. 5. FIG. 5 is a flowchart of the process that is performed when a heap area is acquired in the information processing apparatus according to the first embodiment.

The heap area acquiring unit 51 acquires a heap area from a kernel in Step S101. The heap area acquiring unit 51 notifies the mark adding unit 131 of the addition of a mark to the data.

The mark adding unit 131 notifies the bit inverting unit 141 of an instruction for inverting specific three bits of provisional data. The ECC generating unit 14 generates a check code of one byte that corresponds to the provisional data based on the data acquired by inverting specific three bits of the acquired provisional data. Then, the ECC generating unit 14 adds the generated check code of one byte to the provisional data that is acquired from the register 12 and stores resultant data in the heap area. The ECC generating unit 14 adds marks to the entire acquired area as a heap area inside the memory 2 under the control of the heap area acquiring unit 51 for the mark adding unit 131 in Step S102.

When data is stored in or read from the heap area of the memory 2 by the program 5 in this state, the error detecting unit 15 reads out data from a memory area having the designated address in Step S103.

In such a case, since data to which a mark has been added is stored in the memory area that is referred to by the program 5, the error detecting unit 15 detects that a mark is added to the read-out data, thereby detecting an access violation for accessing an unallocated area in Step S104.

Here, although Steps S103 and S104 are represented in FIG. 5 so as to describe the process of detecting an access violation for accessing an unallocated area, in a case where there is no access violation for accessing an unallocated area, Steps S103 and S104 can be omitted.

Figure 6:
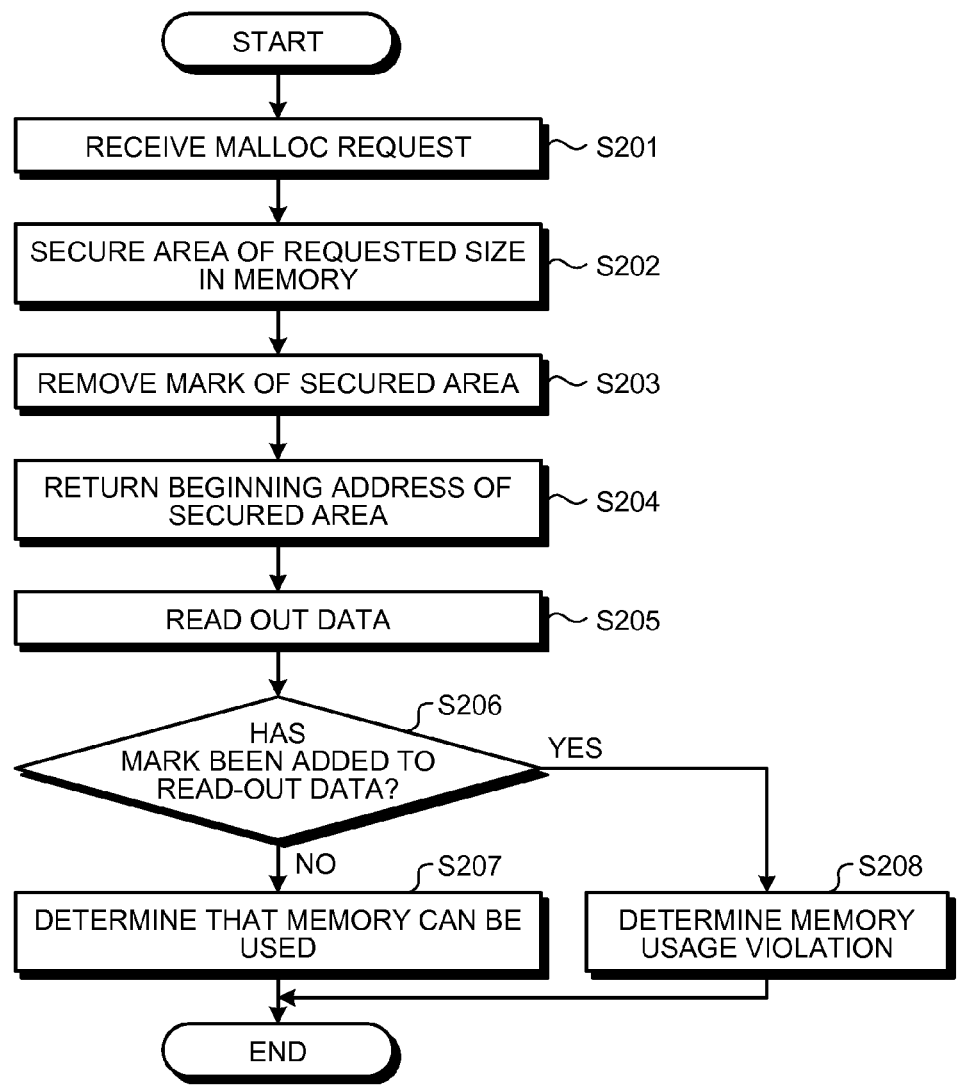
FIG. 6 is a flowchart of a process that is performed in a case where there is a request for securing a memory area in the information processing apparatus according to the first embodiment.

Next, the flow of a process in a case where there is a request for securing a memory area in the information processing apparatus according to this embodiment will be described with reference to FIG. 6. FIG. 6 is a flowchart of a process that is performed in a case where there is a request for securing a memory area in the information processing apparatus according to the first embodiment. Here, as the request for securing a memory area, "malloc" in the C language will be described as an example.

The area securing unit 52 receives a malloc request from a process in Step S201.

The area securing unit 52 secures an area of a requested size in a heap area of the memory 2 in Step S202. The area securing unit 52 instructs the mark removing unit 132 to remove the mark of the data.

The mark removing unit 132 notifies the bit inverting unit 141 of an instruction for generating a normal error correcting code. The ECC generating unit 14 generates a check code of one byte that corresponds to the data acquired from the register 12. Then, the ECC generating unit 14 adds the generated check code of one byte to the data acquired from the register 12 and stores resultant data in the secured area. The ECC generating unit 14 removes the marks of all the data in the secured memory area of the heap area inside the memory 2 under the control of the area securing unit 52 for the mark removing unit 132 in Step S203.

The area securing unit 52 returns a beginning address of the secured area to the process that has output the malloc request in Step S204.

When a command for storing data into the memory 2 or for reading out data is input from the program 5, the error detecting unit 15 reads out data from a memory area having the designated address in Step S205.

The error detecting unit 15 determines whether or not a mark has been added to the data read out from the address referred to by the program 5 in Step S206.

In a case where any mark has not been added (No in Step S206), the error detecting unit 15 determines that the memory can be used in Step S207. On the other hand, in a case where a mark has been added (Yes in Step S206), the error detecting unit 15 detects a memory usage violation in Step S208.

Figure 7:
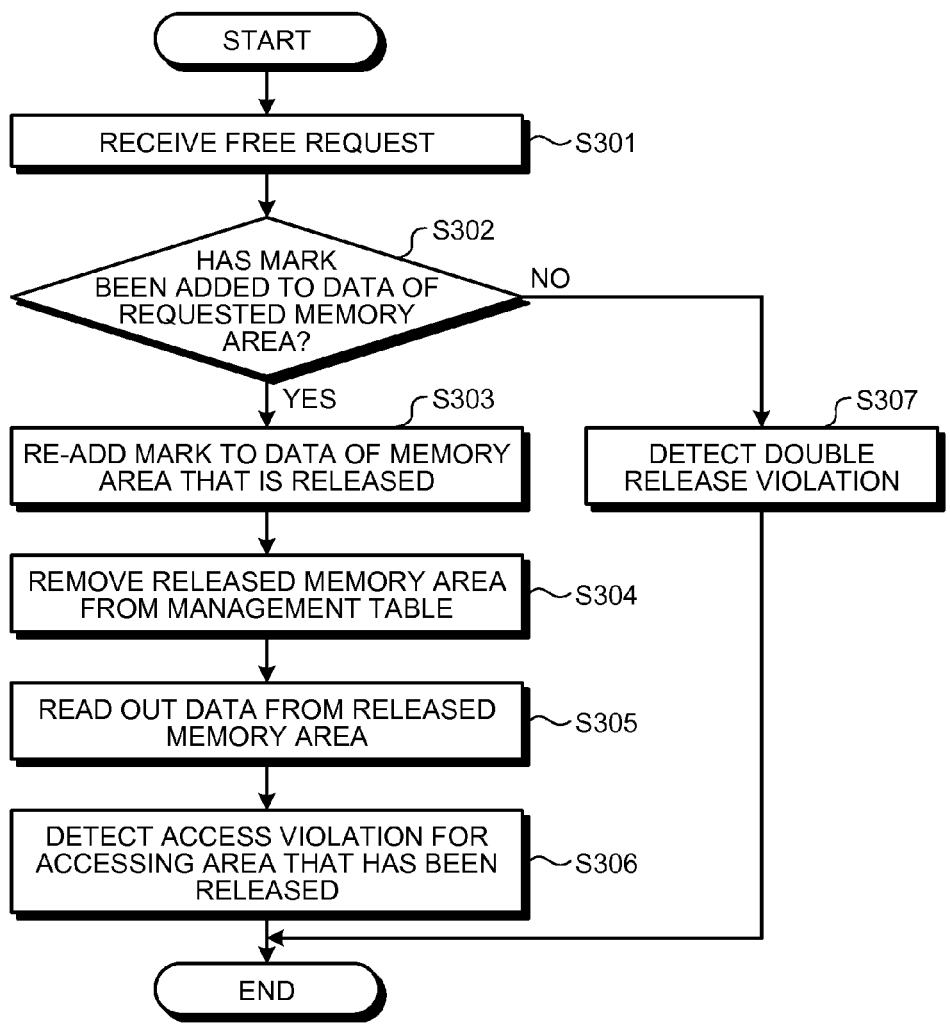
FIG. 7 is a flowchart of a process that is performed in a case where there is a request for releasing a memory area in the information processing apparatus according to the first embodiment.

Next, the flow of a process performed in the information processing apparatus according to this embodiment in a case where there is a request for releasing a memory area will be described with reference to FIG. 7. FIG. 7 is a flowchart of a process that is performed in a case where there is a request for releasing a memory area in the information processing apparatus according to the first embodiment. Here, as a request for releasing a memory area, an example of "free" in the C language will be described.

The area releasing unit 53 receives a free request from a process in Step S301. The area releasing unit 53 specifies a memory area that is designated to be released. In addition, the area releasing unit 53 instructs the mark adding unit 131 to re-add a mark. The mark adding unit 131 notifies the bit inverting unit 141 of an instruction for inverting specific three bits of the provisional data.

The error detecting unit 15 determines whether or not a mark has been added to the data stored in the memory area to be released in Step S302.

In a case where a mark has been added (Yes in Step S302), the ECC generating unit 14 generates a check code of one bye that corresponds to the provisional data based on the data acquired by inverting the specific three bits of the provisional data acquired from the register 12. Then, the ECC generating unit 14 adds the generated check code of one byte to the provisional data and stores resultant data in the released memory area. The ECC generating unit 14 re-adds marks to the entire released memory area of the heap area inside the memory 2 under the control of the area releasing unit 53 for the mark adding unit 131 in Step S303.

The area releasing unit 53 removes the released memory area from the management table in Step S304.

In such a state, when a command for storing or reading out data in or from the released memory area is input from the program 5, the error detecting unit 15 reads out data from the released memory area in Step S305.

In such a case, since data to which a mark has been added is stored in the read-out memory, the error detecting unit 15 detects an access violation for accessing a memory area that has been released in Step S306.

In contrast to this, in a case where any mark has not been added to the data of the memory area that has been requested to be released (No in Step S302), the error detecting unit 15 detects a double release violation in Step S307.

Here, although Steps S305 and S306 are represented in FIG. 7 so as to describe the process of detecting an access violation for accessing an area that has been released, in a case where there is no access violation for accessing an area that has been released, Steps S305 and S306 can be omitted.

Figure 8:
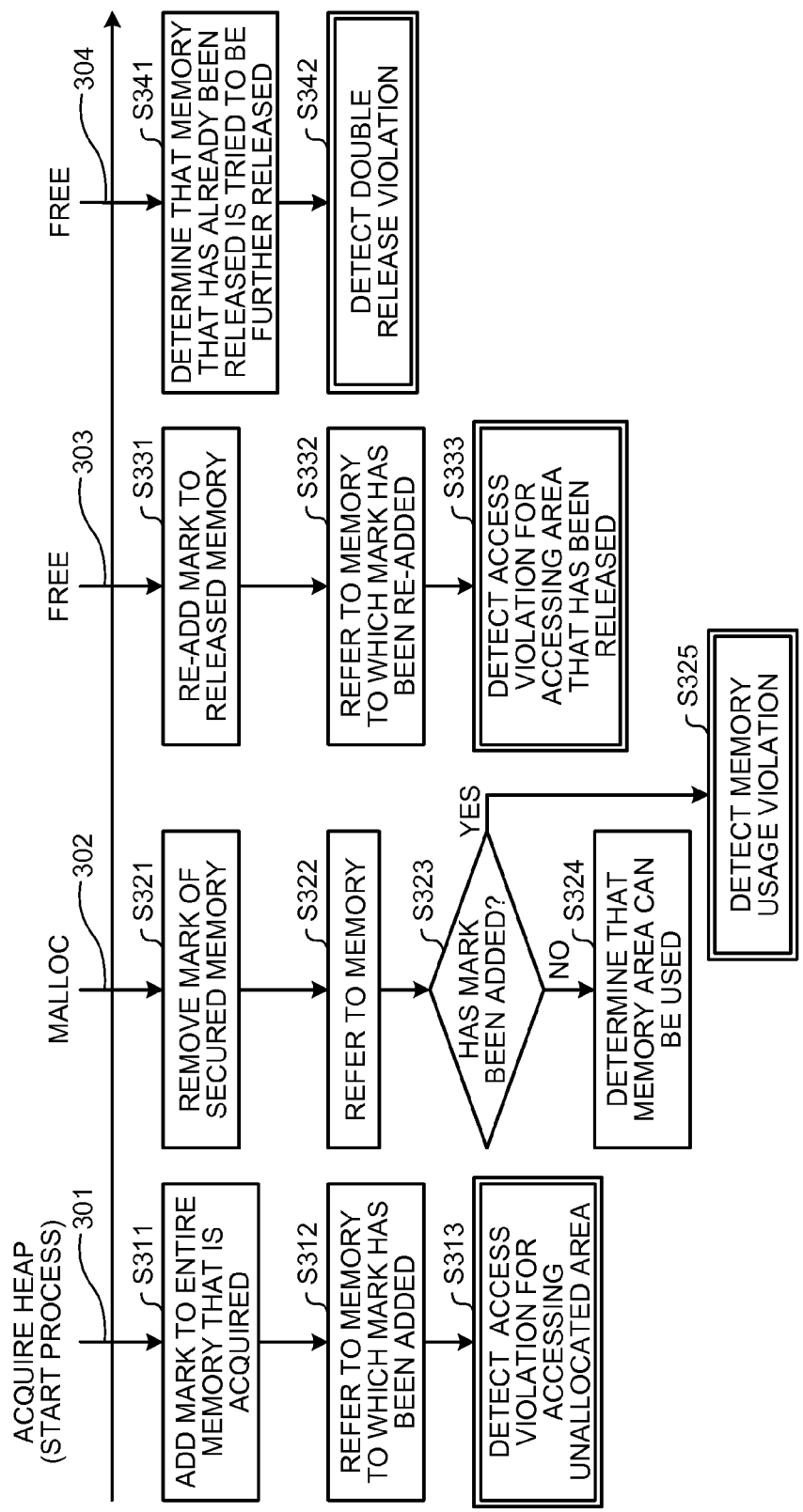
FIG. 8 is a diagram that illustrates a mark adding/removing process and errors that are accompanied with the process in a time series.

Next, the execution of processes in a time series and the occurrences of errors that are accompanied with the processes will be described with reference to FIG. 8. FIG. 8 is a diagram that illustrates a mark adding/removing process and errors that are accompanied with the process in a time series. In FIG. 8, time elapses in a direction denoted by arrows. In addition, each box surrounded by a doublet illustrates the detection of an error.

The process is started at time 301, and the heap area acquiring unit 51 acquires a heap area from a kernel.

The ECC generating unit 14 stores data to which a mark has been added to the entire area that is acquired as the heap area in Step S311. Here, storing the data to which a mark has been added in a memory area will be referred to as adding a mark to a memory.

In this state, the program 5 refers to a memory to which a mark has been added in Step S312. In such a state, the error detecting unit 15 reads out data from the memory to which the mark has been added.

In such a case, since an area used by the process is not secured, and data is read out from the memory to which a mark has been added, the error detecting unit 15 detects an access violation for accessing an unallocated area in Step S313.

At time 302, the area securing unit 52 receives a malloc request from a process and secures a memory area.

The ECC generating unit 14 removes a mark of the data that is stored in the secured memory area in Step S321. Here, removing a mark of the data that is stored in a memory area will be referred to as removing a mark of the memory.

The process refers to a memory so as to store or load data in Step S322. The error detecting unit 15 reads out data from an address that is designated by the process.

The error detecting unit 15 determines whether or not a mark has been added to the read-out data in Step S323. In a case where any mark has not been added (No in Step S323), the memory referred to by the process is a memory area that is secured for being used by the process, and accordingly, the error detecting unit 15 determines that the memory area can be used in Step S324. Thereafter, the ECC generating unit 14 or the error detecting unit 15 stores data or reads out data into or from the memory referred to by the process. On the other hand, in a case where a mark has been added (Yes in Step S323), the memory area referred to by the process is not a memory area that is secured for being used by the process, and accordingly, the error detecting unit 15 detects a memory usage violation in Step S325.

At time 303, the area releasing unit 53 releases the memory area upon receiving a free request from the process.

The ECC generating unit 14 stores the data to which the mark has been added in the released memory area again in Step S331. Here, storing the data to which a mark has been added in a memory area in the memory again will be referred to as re-addition of a mark to the memory.

In such a state, the program 5 refers to the memory area to which the mark has been re-added in Step S332. Then, the error detecting unit 15 reads out data from the memory to which the mark has been re-added.

In such a case, the memory area from which the data has been read out has already been released, and data is read out from the memory area that is in a state in which the mark has been re-added, and accordingly, the error detecting unit 15 detects an access violation for accessing an area that has been released in Step S333.

In addition, at time 304, the area releasing unit 53 receives a free request from a process and releases the memory area that has already been released again.

The error detecting unit 15 checks whether or not a mark has been added to the data that is stored in the released memory area. In such a case, since the memory that has already been released is further released, the error detecting unit 15 detects that a mark has been added to the released memory. Accordingly, the error detecting unit 15 determines that a memory that has already been released is tried to be further released in Step S341. Thus, the error detecting unit 15 detects a double release violation in Step S342.

As described above, the information processing apparatus according to this embodiment stores mark-added data in the entire memory area that is acquired as a heap area. Thereafter, the information processing apparatus removes the mark of the data of the memory area that is secured as an area to be used by the process. In addition, in a case where the secured memory area is released, mark-added data is stored again in the entire memory area to be released. Accordingly, in a case where an area that is not secured as a use area is accessed, a mark follows the data stored in the accessed memory, and accordingly, it can be immediately known that an access violation occurs. In addition, when the memory area that has been released is tried to be released again, a mark follows the data that is stored in the memory area, and accordingly, it can be immediately known that the area is difficult to be released.

In addition, in such an error detecting process, it is determined whether or not an error correcting code having a specific value is added using the ECC, and accordingly, an error can be detected through a process performed by hardware. Accordingly, the information processing apparatus according to this embodiment can detect memory usage violations such as an access to an unallocated area, an access to an area that has already been released, and a double release at high speed by hardware.

Furthermore, since the ECC is used for adding a mark to data, the use of a memory, for example, for each eight bytes can be checked. Therefore, the information processing apparatus according to this embodiment can detect unauthorized use of a memory with granularity that is finer than that of the process of an MMU in units of pages each having a large size of several kilobytes to several megabytes or the like.

In other words, according to the information processing apparatus of this embodiment, a memory can be protected at speed higher than that of a conventional memory protection process performed by software with granularity finer than that of a conventional process using an MMU. Accordingly, the detection of a bug that causes memory destruction in large-scale software, which requires high performance, can be performed in an easy manner, and the quality of large-scale software can be easily secured.

[b] Second Embodiment

Figure 9:
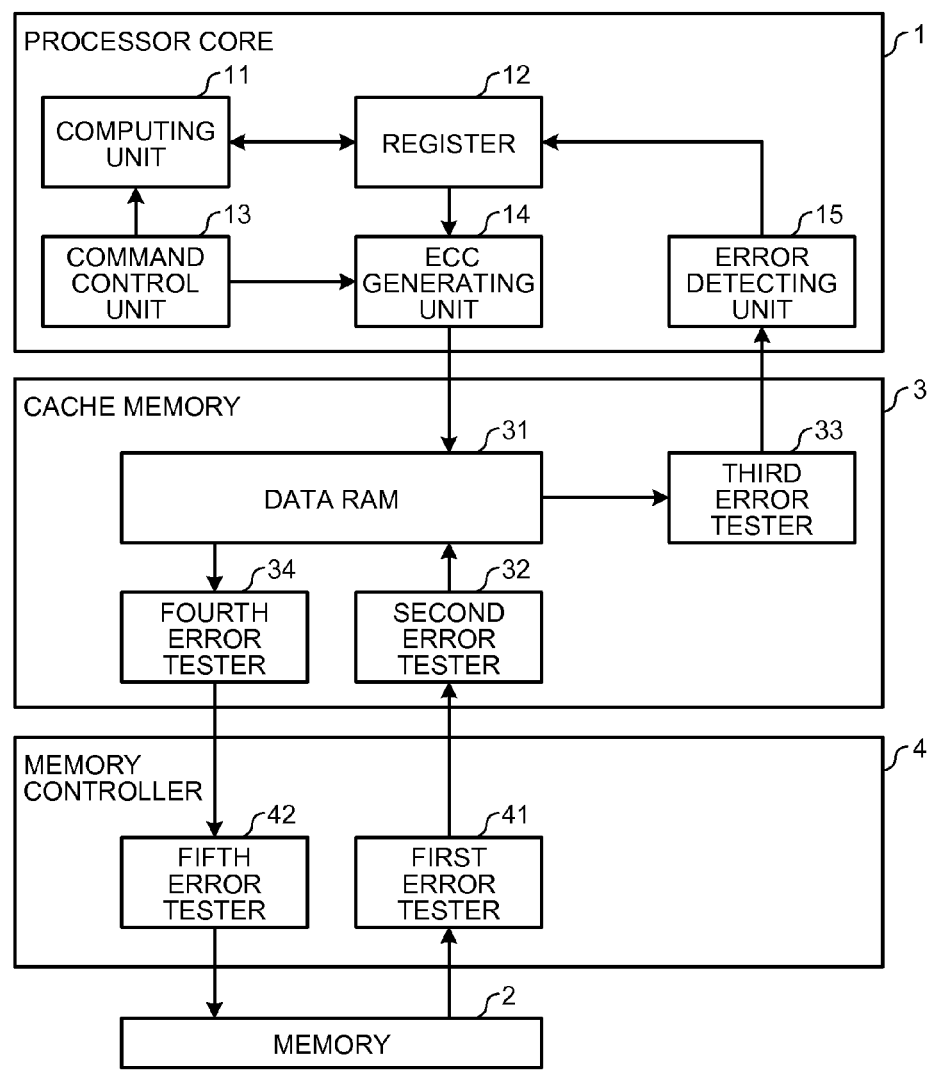
FIG. 9 is a block diagram of an information processing apparatus according to a second embodiment.

FIG. 9 is a block diagram of an information processing apparatus according to a second embodiment. The information processing apparatus according to this embodiment further includes a cache memory 3 and a memory controller 4, in addition to the information processing apparatus according to the first embodiment. In the information processing apparatus according to this embodiment, description of each unit that has the same function as that of the information processing apparatus according to the first embodiment will not be presented.

The cache memory 3 includes a data random access memory (RAM) 31, a second error tester 32, a third error tester 33, and a fourth error tester 34. In addition, the memory controller 4 includes a first error tester 41 and a fifth error tester 42. There are cases where a boundary of the chip is between the cache memory 3 and the memory controller 4. Since the rate of the occurrence of an error in inter-chip communication is high, the information processing apparatus of this embodiment is configured such that error testers are arranged on the boundary of the chip on which the possibility of the occurrence of an error is high, and a place at which an error occurs can be specified.

In a case where a request for storing data, reading data, and releasing a memory is received from software, the first error tester 41 reads out corresponding data from a memory 2. Then, the first error tester 41 checks an error in the read-out data. At this time, the first error tester 41 does not detect a mark added by an ECC generating unit 14 and any of the other error testers as an error. Here, the other error testers are the second error tester 32, the third error tester 33, the fourth error tester 34, and the fifth error tester 42. In a case where any error is not detected, the first error tester 41 transmits the received data to the second error tester 32 without changing the data.

In contrast to this, in a case where an error occurs in the read-out data, the first error tester 41 adds a mark that is an error correcting code representing error flag 1, which is acquired by inverting specific three bits of an incorrect code that is determined in advance, to the data. This data is referred to as error flag 1-added data. The specific three bits that are inverted for adding a mark of the error correcting code representing error flag 1 to the data are different from specific three bits that are inverted for the ECC generating unit 14 and the other error testers adding marks. In addition, the first error tester 41 stores mark auxiliary information that represents error flag 1 in the data area. Then, the first error tester 41 transmits the error flag 1-added data to the second error tester 32.

The second error tester 32 receives the data from the first error tester 41. Then, the second error tester 32 checks an error in the received data. At this time, the second error tester 32 does not detect a mark added by the ECC generating unit 14 and any of the other error testers as an error. Here, the other error testers are the first error tester 41, the third error tester 33, the fourth error tester 34, and the fifth error tester 42. In a case where any error is not detected, the second error tester 32 stores the received data in the data RAM 31 without changing the data.

On the other hand, in a case where an error occurs in the received data, the second error tester 32 adds a mark that is an error correcting code representing error flag 2, which is acquired by inverting specific three bits of an incorrect code determined in advance, to the data. This data is referred to as error flag 2-added data. The specific three bits that are inverted for adding a mark of the error correcting code representing error flag 2 to the data are different from specific three bits that are inverted for the ECC generating unit 14 and the other error testers adding marks. In addition, the second error tester 32 stores mark auxiliary information that represents error flag 2 in the data area. Then, the second error tester 32 stores the error flag 2-added data in the data RAM 31.

The third error tester 33 reads out the data stored by the second error tester 32 from the data RAM 31. Then, the third error tester 33 checks an error in the read-out data. At this time, the third error tester 33 does not detect a mark added by the ECC generating unit 14 and any of the other error testers as an error. Here, the other error testers are the first error tester 41, the second error tester 32, the fourth error tester 34, and the fifth error tester 42. In a case where any error is not detected, the third error tester 33 transmits the received data to the error detecting unit 15 without changing the data.

On the other hand, in a case where an error occurs in the received data, the third error tester 33 adds a mark that is an error correcting code representing error flag 3, which is acquired by inverting specific three bits of an incorrect code determined in advance, to the data. This data is referred to as error flag 3-added data. The specific three bits that are inverted for adding a mark of the error correcting code representing error flag 3 to the data are different from specific three bits that are inverted for the ECC generating unit 14 and the other error testers adding marks. In addition, the third error tester 33 stores mark auxiliary information that represents error flag 3 in the data area. Then, the third error tester 33 transmits the error flag 3-added data to the error detecting unit 15.

In a case where a request for storing data, reading data, and releasing a memory is received from software, the error detecting unit 15 determines whether or not a mark, which has been added by the ECC generating unit 14, is added in the data read out from the memory 2. Then, the error detecting unit 15 determines whether or not a memory usage violation occurs depending on whether or not there is a mark. In a case where a memory usage violation occurs, the error detecting unit 15 registers a report used for the notification of the occurrence of a memory usage violation in the register 12.

When a heap area is acquired, a memory area is released, or data is stored, the ECC generating unit 14 stores data in the data RAM 31 of the cache memory 3. The ECC generating unit 14 stores both the mark-added data and the mark-removed data in the data RAM 31.

The fourth error tester 34 reads out the data stored in the data RAM 31. Then, the fourth error tester 34 checks an error in the read-out data. At this time, the fourth error tester 34 does not detect a mark added by the ECC generating unit 14 and any of the other error testers as an error. Here, the other error testers are the first error tester 41, the second error tester 32, the third error tester 33, and the fifth error tester 42. In a case where any error is not detected, the fourth error tester 34 transmits the read-out data to the fifth error tester 42 without changing the data.

On the other hand, in a case where an error occurs in the read-out data, the fourth error tester 34 adds a mark that is an error correcting code representing error flag 4, which is acquired by inverting specific three bits of an incorrect code determined in advance, to the data. This data is referred to as error flag 4-added data. The specific three bits that are inverted for adding a mark of the error correcting code representing error flag 4 to the data are different from specific three bits that are inverted for the ECC generating unit 14 and the other error testers adding marks. In addition, the fourth error tester 34 stores mark auxiliary information that represents error flag 4 in the data area. Then, the fourth error tester 34 transmits the error flag 4-added data to the fifth error tester 42.

The fifth error tester 42 receives the data from the fourth error tester 34. Then, the fifth error tester 42 checks an error in the received data. At this time, the fifth error tester 42 does not detect a mark added by the ECC generating unit 14 and any of the other error testers as an error. Here, the other error testers are the first error tester 41, the second error tester 32, the third error tester 33, and the fourth error tester 34. In a case where any error is not detected, the fifth error tester 42 stores the received data in the memory 2 without changing the data.

On the other hand, in a case where an error occurs in the received data, the fifth error tester 42 adds a mark that is an error correcting code representing error flag 5, which is acquired by inverting specific three bits of an incorrect code determined in advance, to the data. This data is referred to as error flag 5-added data. The specific three bits that are inverted for adding a mark of the error correcting code representing error flag 5 to the data are different from specific three bits that are inverted for the ECC generating unit 14 and the other error testers adding marks. In addition, the fifth error tester 42 stores mark auxiliary information that represents error flag 5 in the data area. Then, the fifth error tester 42 stores the error flag 5-added data in the memory 2.

As described above, the information processing apparatus according to this embodiment detects errors by using the error testers arranged in various places, generates mutually independent check codes, and adds the generated check codes to the data. Therefore, the information processing apparatus according to this embodiment can specify a place at which the error occurs in an easy manner. In addition, since the information processing apparatus according to this embodiment generates a mark that represents the use state of the memory using a check code other than the check codes generated by the error testers, unauthorized use of a memory can be easily checked together with specifying the place at which the error occurs.

[c] Third Embodiment

Figure 10:
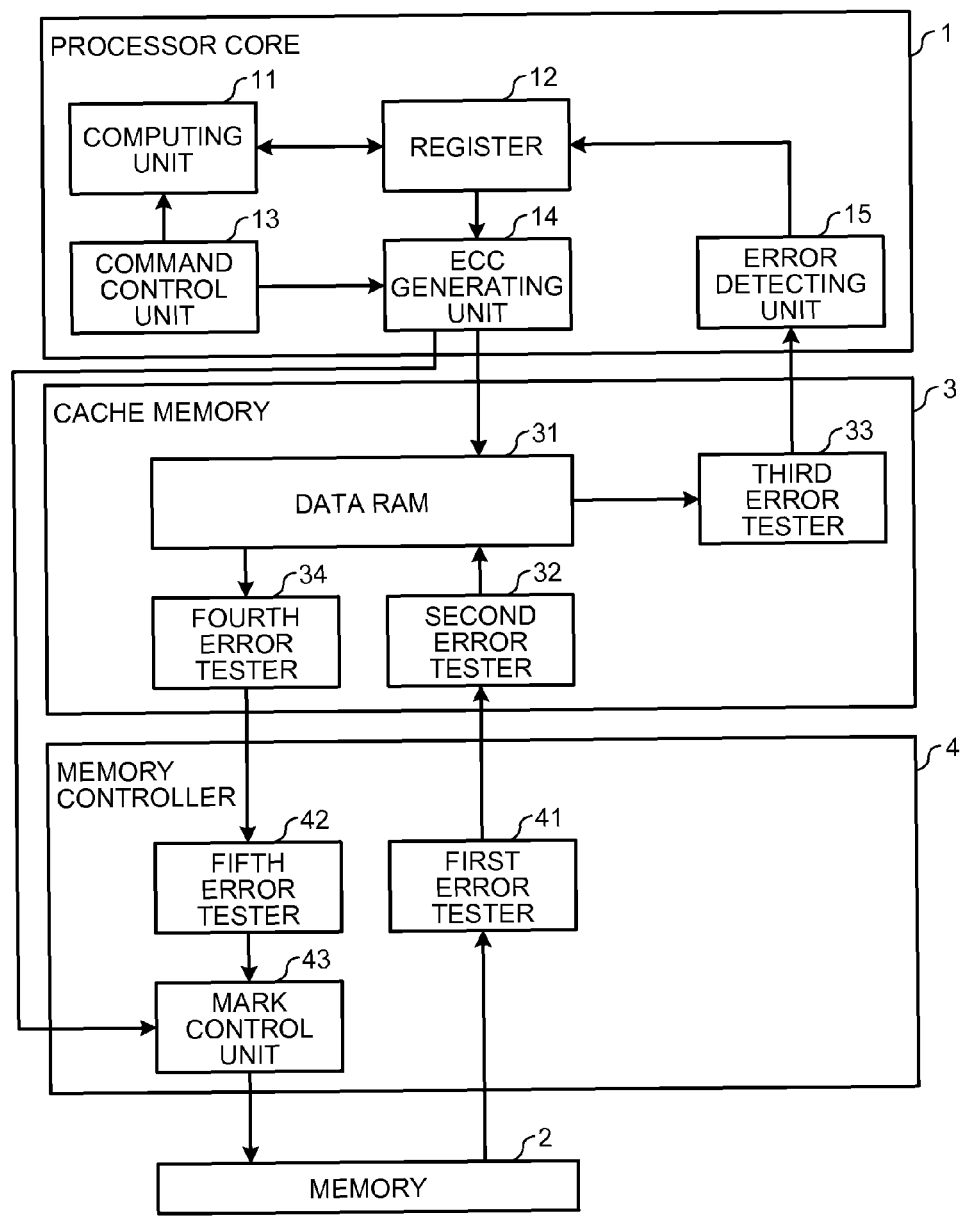
FIG. 10 is a block diagram of an information processing apparatus according to a third embodiment.

FIG. 10 is a block diagram of an information processing apparatus according to a third embodiment. The information processing apparatus according to this embodiment has a configuration in which the addition of a mark of the use state of a memory is performed by the memory controller 4 in the information processing apparatus according to the second embodiment. The information processing apparatus according to this embodiment further includes a mark control unit 43 in addition to the information processing apparatus according to the second embodiment. In the information processing apparatus according to this embodiment, description of each unit that has the same function as that of the information processing apparatus according to the first embodiment or 2 will not be presented.

In a case where a heap area is acquired, the ECC generating unit 14 notifies the mark control unit 43 of the memory controller 4 of an address of the memory area acquired as the heap area and a check code that is generated by inverting specific three bits of provisional data. In addition, the ECC generating unit 14 notifies the mark control unit 43 of an instruction for adding the generated check code to the data to be stored in the memory area acquired as the heap area and storing resultant data in the memory 2.

Then, the ECC generating unit 14 stores the provisional data in the data RAM 31 without adding the generated check code to the data.

In addition, in a case where a memory area is secured for a process, the ECC generating unit 14 notifies the mark control unit 43 of the memory controller 4 of an instruction for removing the address of the secured memory area, the generated check code corresponding to the data, and the mark.

Then, the ECC generating unit 14 stores the data read out from a register 121 in the data RAM 31 without removing the mark.

In addition, in a case where a memory area is released, the ECC generating unit 14 notifies the mark control unit 43 of the memory controller 4 of an instruction for re-adding the address of the released memory area, the check code generated by inverting specific three bits of the provisional data, and the mark.

Then, the ECC generating unit 14 stores the provisional data in the data RAM 31 without re-adding the mark.

When the heap area is acquired, the mark control unit 43 receives information of the address of the heap area and the check code from the ECC generating unit 14. In addition, the mark control unit 43 receives an instruction for adding the check code and storing resultant data in the memory 2 from the ECC generating unit 14. Then, the mark control unit 43 adds the mark to the data received from the fifth error tester 42 using the received check code and stores data in the area of the memory 2 having the address of the heap area. The mark control unit 43 stores mark-added data in the entire heap area.

When a memory area is secured, the mark control unit 43 receives the address of the secured memory area, information of the check code, and an instruction for removing the mark from the ECC generating unit 14. Then, the mark control unit 43 removes the mark by adding the check code received from the ECC generating unit 14 to the data received from the fifth error tester 42 and stores data in the area of the memory 2 having the address of the secured memory area. The mark control unit 43 stores mark-added data in the entire memory area that has been secured.

When a memory area is released, the mark control unit 43 receives the address of the released memory area, information of the check code, and an instruction for re-adding a mark from the ECC generating unit 14. Then, the mark control unit 43 adds a mark to the data received from the fifth error tester 42 using the received check code and stores data in the area of the memory 2 having the address of the released memory area. The mark control unit 43 stores mark-added data in the entire memory area that has been released.

As described above, in the information processing apparatus according to this embodiment, the processor core instructs the memory controller to add and remove a mark, which triggers the memory controller to repeatedly add and remove the mark. Accordingly, the load of the processor core which is caused by generating and removing marks can be reduced, and a load between the processor core and the memory in the bus can be reduced.

According to an aspect, unauthorized use of a memory can be prevented by a hardware mechanism.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
 a bit inverting unit that inverts specific three bits of first data stored in a first storage area of a memory when the first storage area is secured as a heap area and inverts the specific three bits of second data stored in a second storage area of a memory when the second storage area is secured as the heap area,
 an information adding unit that adds first information to the first data by storing the first data in which the specific three bits are inverted by the bit inverting unit in the first storage area and adds second information to the second data by storing the second data in which the specific three bits are inverted by the bit inverting unit in the second storage area, the first information and the second information being the data in which a predetermined error is detected by performing an error detecting process of the first data and the second data respectively;

a removing unit that removes the second information added to the second data by rewriting the second information with the error detecting information of the second data without rewriting the first information added to the first data when the second storage area out of the first storage area and the second storage area is configured to be usable; and an error detecting unit that performs an error detecting process of read-out data using information that is added to the read-out data in a case where the first data or the second data stored in the memory is read out and that determines a storage area which stores the read-out data in which the predetermined error is detected as an unusable area when the predetermined error is detected by the error detecting process of the read-out data.

2. An information processing apparatus according to claim 1, further comprising:

an area releasing unit that releases the second storage area that is secured as a usable area; and an information re-adding unit that adds third information that is generated by causing an error to be occurred in error detection information of third data to be stored in the second storage area that has been released by the area releasing unit to the third data.

3. An information processing apparatus according to claim 2, wherein the error detecting unit determines whether or not the second information is added to data stored in the area that is to be released by the area releasing unit and detects an error in a case where the second information is added.

4. An information processing apparatus according to claim 1, wherein the memory checks an error;

wherein the information adding unit adds the second information to the second data by writing error information that represents a predetermined error into an error checking area of the second data; and wherein the removing unit rewrites the second information of the error checking area of the second data with the error detecting information of the second data.

5. A method of controlling an information processing apparatus, the method comprising:

inverting, using a processor, specific three bits of first data stored in a first storage area of a memory when the first storage area is secured as a heap area;

inverting, using a processor, the specific three bits of second data stored in a second storage area of a memory when the second storage area is secured as the heap area;

adding first information, using a processor, to the first data by storing the first data in which the specific three bits are inverted by the bit inverting unit in the first storage area and adding second information to the second data by storing the second data in which the specific three bits are inverted by the bit inverting unit in the second storage area, the first information and the second information being the data in which a predetermined error is detected by performing an error detecting process of the first data and the second data respectively;

removing the second information added to the second data by rewriting the second information with the error detecting information of the second data without rewriting the first information added to the first data when the second storage area out of the first storage area and the second storage area is configured to be usable;

performing, using a processor, an error detecting process of read-out data using information that is added to the read-out data in a case where the first data or the second data stored in the memory is read out; and determining, using a processor, a storage area which stores the read-out data in which the predetermined error is detected as an unusable area when the predetermined error is detected by the error detecting process of the read-out data.

6. A non-transitory computer-readable recording medium having stored therein a program for controlling an information processing apparatus that causes a computer to perform:

inverting, using a processor, specific three bits of first data stored in a first storage area of a memory when the first storage area is secured as a heap area;

inverting, using a processor, the specific three bits of second data stored in a second storage area of a memory when the second storage area is secured as the heap area;

adding first information to the first data by storing the first data in which the specific three bits are inverted by the bit inverting unit in the first storage area and adding second information to the second data by storing the second data in which the specific three bits are inverted by the bit inverting unit in the second storage area, the first information and the second information being the data in which a predetermined error is detected by performing an error detecting process of the first data and the second data respectively;

removing the second information added to the second data by rewriting the second information with the error detecting information of the second data without rewriting the first information added to the first data when the second storage area out of the first storage area and the second storage area is configured to be usable;

performing an error detecting process of read-out data using information that is added to the read-out data in a case where the first data or the second data stored in the memory is read out; and determining a storage area which stores the read-out data in which the predetermined error is detected as an unusable area when the predetermined error is detected by the error detecting process of the read-out data.

7. An information processing apparatus according to claim 1, wherein the information adding unit adds the second information that is generated by causing the predetermined error to the second data when the second storage area is secured as a heap area; and the removing unit rewrites the second information when the second storage area is secured as a memory area.

* * * * *

UNITED STATES PATENT AND TRADEMARK OFFICE
CERTIFICATE OF CORRECTION

PATENT NO. : 8,910,004 B2
APPLICATION NO. : 13/612098
DATED : December 9, 2014
INVENTOR(S) : Hideyuki Unno Page 1 of 1

It is certified that error appears in the above-identified patent and that said Letters Patent is hereby corrected as shown below:

Title page

Item (56) Column 2 (Other Publications), Line 3:

Delete "Repor" and insert --Report--, therefor.

Signed and Sealed this
Thirteenth Day of October, 2015

Michelle K. Lee
*Director of the United States Patent and Trademark Office*